United States Patent
Osawa (10) Patent No.: US 9,352,660 B2
(45) Date of Patent: May 31, 2016

(54) COMBINED CHARGING INLET

(71) Applicant: Sumitomo Wiring Systems, Ltd., Yokkaichi, Mie (JP)

(72) Inventor: Kiyoshi Osawa, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/687,019

(22) Filed: Apr. 15, 2015

(65) Prior Publication Data

US 2015/0343914 A1    Dec. 3, 2015

(30) Foreign Application Priority Data

May 28, 2014    (JP) ................... 2014-109849

(51) Int. Cl.
| | | |
|---|---|---|
| *B60L 11/18* | (2006.01) | |
| *H01R 13/52* | (2006.01) | |
| *H01R 13/518* | (2006.01) | |
| *H01R 13/73* | (2006.01) | |

(52) U.S. Cl.
CPC .......... *B60L 11/1818* (2013.01); *H01R 13/518* (2013.01); *H01R 13/5227* (2013.01); *H01R 13/73* (2013.01); *H01R 2201/26* (2013.01)

(58) Field of Classification Search
USPC .................. 439/205, 206, 551, 559, 586, 587
See application file for complete search history.

(56) References Cited

U.S. PATENT DOCUMENTS

| | | | | | |
|---|---|---|---|---|---|
| 4,793,819 | A | * | 12/1988 | Berg .............................. | 439/142 |
| 5,350,312 | A | * | 9/1994 | Kuno et al. ................... | 439/310 |
| 5,800,188 | A | * | 9/1998 | Barber et al. ................. | 439/142 |
| 5,816,643 | A | * | 10/1998 | Itou et al. .................... | 296/97.22 |
| 5,860,822 | A | * | 1/1999 | Nishide et al. ............... | 439/206 |
| 5,924,893 | A | * | 7/1999 | Eidsvig ......................... | 439/551 |
| 6,375,500 | B1 | * | 4/2002 | Murakami et al. ............ | 439/587 |
| 7,775,807 | B2 | * | 8/2010 | Yamaguchi et al. ......... | 439/76.2 |
| 7,794,276 | B2 | * | 9/2010 | Shigeta et al. ................ | 439/588 |
| 7,950,930 | B2 | * | 5/2011 | Yoshida et al. .............. | 439/76.2 |
| 8,075,325 | B1 | * | 12/2011 | Kao et al. ...................... | 439/205 |
| 8,079,857 | B2 | * | 12/2011 | Zhu ............................... | 439/205 |
| 8,257,101 | B2 | * | 9/2012 | Ichio ............................. | 439/206 |
| 8,662,910 | B2 | | 3/2014 | Ichio et al. | |
| 2002/0037659 | A1 | * | 3/2002 | Yuasa ........................... | 439/206 |
| 2010/0112841 | A1 | * | 5/2010 | Yong ............................. | 439/271 |

* cited by examiner

*Primary Examiner* — Alexander Gilman
(74) *Attorney, Agent, or Firm* — Gerald E. Hespos; Michael J. Porco; Matthew T. Hespos (57) ABSTRACT

A combined charging inlet (10) including plural connector fitting portions that are integrated, including: an inlet housing (20) including a first hood (50) and a second hood (60) that are provided integrally and continuously with each other. First drains (34A) to (34C) configured to drain water from first cavities (32A) to (32C) that accommodate first terminals (31A) to (31C) in a first connector fitting (30) to a first drain space (33). A first water guide (51) guides water from the first drain space (33) to a second drain space (43). Second drains (44A) and (44B) drain water from second cavities (42A) and (42B) that accommodate second terminals (41A) and (41B) in a second connector fitting (40) to the second drain space (43), and a second water guide (61) guides water from the second drain space (43) to outside of a vehicle.

5 Claims, 7 Drawing Sheets

COMBINED CHARGING INLET

BACKGROUND

1. Field of the Invention

The technology disclosed herein relates to a combined charging inlet.

2. Description of the Related Art

U.S. Pat. No. 8,662,910 discloses a conventional vehicle-side connector including a mounting plate fixedly mounted to an outer panel of the body of a vehicle. The vehicle-side connector includes a terminal accommodating portion that accommodates a terminal fitting and that protrudes in the front-rear direction through the mounting plate. The vehicle-side connector also has a rearwardly open outer tube that protrudes rearward toward the inside of the vehicle from the mounting plate. A tapered drain channel is provided on the inner lower surface of the outer tube and is connected to the outside of the vehicle. The portion of the terminal accommodating portion that protrudes toward the inside of the vehicle is covered by the outer tube around the entire perimeter thereof. A rubber stopper is mounted in the outer tube portion to define a sealed space in the outer tube and sealing the entire terminal accommodating portion. The inner lower surface of the sealed space is a tapered inclined surface connected with the drain channel, and the inclined surface forms a part of the rubber stopper. Consequently, water that enters the terminal accommodating portion from the outside of the vehicle temporarily enters the sealed space and is discharged to the outside of the vehicle through the inclined surface and the drain channel.

The above-described vehicle-side connector uses a drain route by which water is discharged to the outside of the vehicle through the sealed space that is disposed closer to the inside of the vehicle than the mounting plate. This drain route is not desirable from the viewpoint of preventing entry of water into the vehicle.

SUMMARY OF THE INVENTION

A combined charging inlet includes a plurality of connector fittings that are integrated. The charging inlet includes an inlet housing with a first hood disposed around a first connector fitting and outside of a vehicle, and a second hood disposed around a second connector fitting located below the first connector fitting and outside of the vehicle. The first connector fitting and the second hood are provided integrally and continuously with each other. A first drain is formed between an outer peripheral surface of the first connector fitting and an inner peripheral surface of the first hood and is configured to drain water from a first cavity that accommodates a first terminal in the first connector fitting to a first drain space. A first water guide is formed between an outer peripheral surface of the second connector fitting and an inner peripheral surface of the second hood and is configured to guide water from the first drain space to a second drain space. A second drain is configured to drain water from a second cavity that accommodates a second terminal in the second connector fitting portion to the second drain space; and a second water guide is configured to guide water from the second drain space to outside of the vehicle.

With this configuration, the first drain is provided for the first connector fitting, the first water guide is provided for the first and second hoods, the second drain is provided for the second connector fitting, the second water guide is provided for the second hood, and all of the first and second connector fittings and the first and second hoods are disposed outside of the vehicle. Accordingly, it is possible to achieve a drain route that prevents the entry of water into the vehicle.

The first connector fitting may be formed separately from the inlet housing, and be configured to be fixedly mounted to a mounting hole formed in the inlet housing from a rear in a fitting direction, and an O-ring may be sandwiched between the outer peripheral surface of the first connector fitting and an inner peripheral surface of the mounting hole. With this configuration, the first connector fitting is formed separately from the inlet housing. Therefore, the first hood will not obstruct the mold removal at the time of molding the first drain of the first connector fitting. Further, the O-ring prevents the entry of water into the vehicle from the mounting hole.

The second drain may include a second drain hole formed between an inner peripheral surface of the second cavity and the outer peripheral surface of the second connector fitting. A mold removal hole causes the second drain hole to face rearward (be open to the rear) in the fitting direction, and a rubber stopper is mounted to the mold removal hole from the rear in the fitting direction so as to seal an inside of the vehicle and define the second drain hole. With this configuration, water that has entered the second cavity can be caused to enter the second drain hole and be drained through the second drain hole to the second drain space. Further, the mold removal hole is open rearward in the fitting direction. Thus, the second hood will not obstruct the mold removal at the time of molding the second drain of the second connector fitting.

The first drain may include a first drain hole formed between an inner peripheral surface of the first cavity and the outer peripheral surface of the first connector fitting portion. With this configuration, water that has entered the first cavity can be caused to enter the first drain hole, and be drained from the first drain hole to the first drain space.

The first water guide may include a first water guide hole formed between the inner peripheral surface of the first hood and the inner peripheral surface of the second hood, and the first water guide hole may be open forward in the fitting direction. With this configuration, water that has entered the first drain space can be caused to enter the first water guide hole, and be guided from the first water guide hole to the second drain space.

According to the technique disclosed herein, it is possible to achieve a drain route that prevents the entry of water into the vehicle.

DETAILED DESCRIPTION

Figure 1:
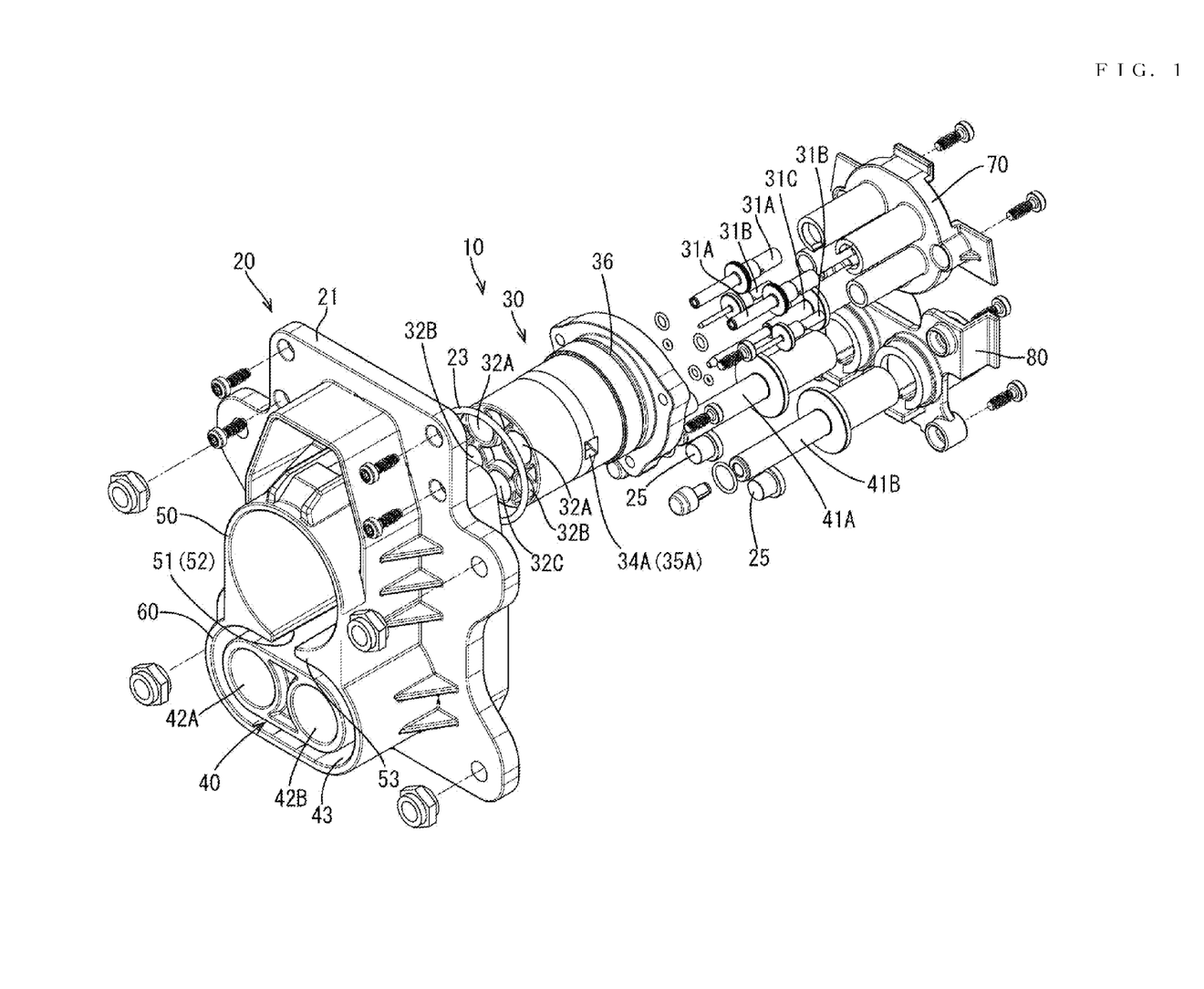
FIG. 1 is an exploded perspective view showing the structural components of a combined charging inlet.

As shown in FIG. 1, a combined charging inlet 10 of the present embodiment includes an inlet housing 20 with a second connector fitting 40, a first connector fitting 30 formed separately from the inlet housing 20, first terminals 31A to 31C that are mounted to the first connector fitting 30, second terminals 41A to 41C that are mounted to the second connector fitting 40, a first retainer 70 that retains the first terminals 31A to 31C, and a second retainer 80 that retains the second terminals 41A to 41C.

The combined charging inlet 10 is a vehicle-side connector that is mounted to a vehicle, such as an electric car or a hybrid car, and is used for charging the battery installed in the vehicle. The battery is charged by connecting a feeding-side connector at a charging facility to the vehicle-side connector from the front. Further, the combined charging inlet 10 is compliant with the "Combined Charging System (CCS system)" in which a normal charging portion and a fast charging portion are integrated. In the present embodiment, the first connector fitting 30 corresponds to the normal charging portion, and the second connector fitting 40 corresponds to the fast charging portion. In the following description, it is assumed that the side of the fitting surface of the combined charging inlet 10 fit to the feeding-side connector is the front side.

Figure 2:
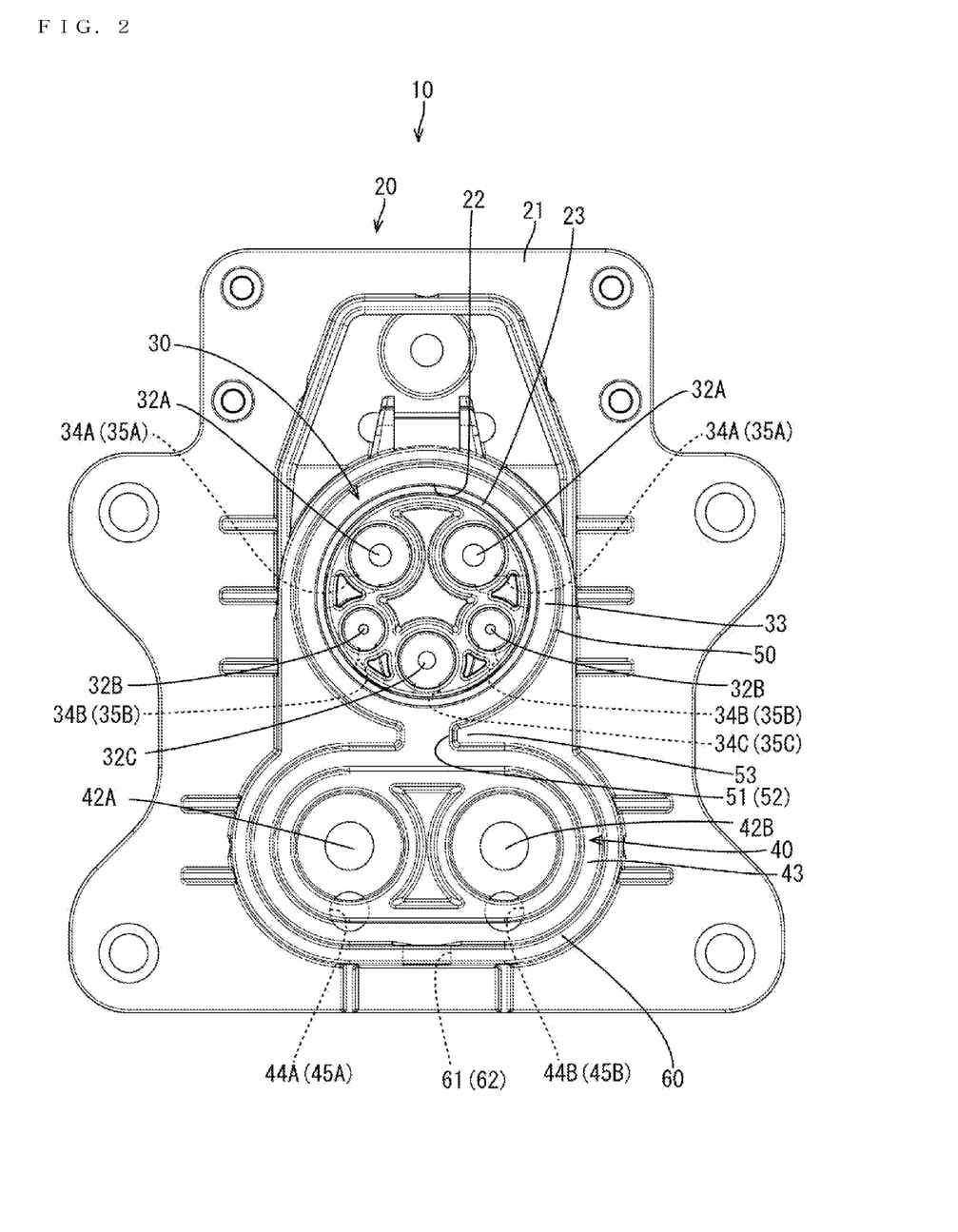
FIG. 2 is a front view showing a state in which a first connector fitting is mounted to an inlet housing, as viewed from the front in a fitting direction.

The inlet housing 20 is made of a synthetic resin, and includes a mounting plate 21 that is mounted and bolted to the body of a vehicle from the outside of the vehicle, as shown in FIGS. 1 and 2. A first hood 50 and a second hood 60 protrude forward at the mounting plate 21. Thus, both the first hood 50 and the second hood 60 are disposed outside of the vehicle. The mounting plate 21 projects out from both the outer peripheral surface of the first hood 50 and the outer peripheral surface of the second hood 60, and extends continuously around the entire perimeter.

The first hood 50 has a precisely circular cylindrical shape as viewed from the front, whereas the second hood 60 has a horizontally elongated, oval cylindrical shape as viewed from the front. The first hood 50 is provided above and continuously with the second hood 60. An intermediate wall 53 is provided between the inner peripheral surface of the first hood 50 and the inner peripheral surface of the second hood 60 and constitutes a shared peripheral wall of the hoods 50 and 60.

Figure 7:
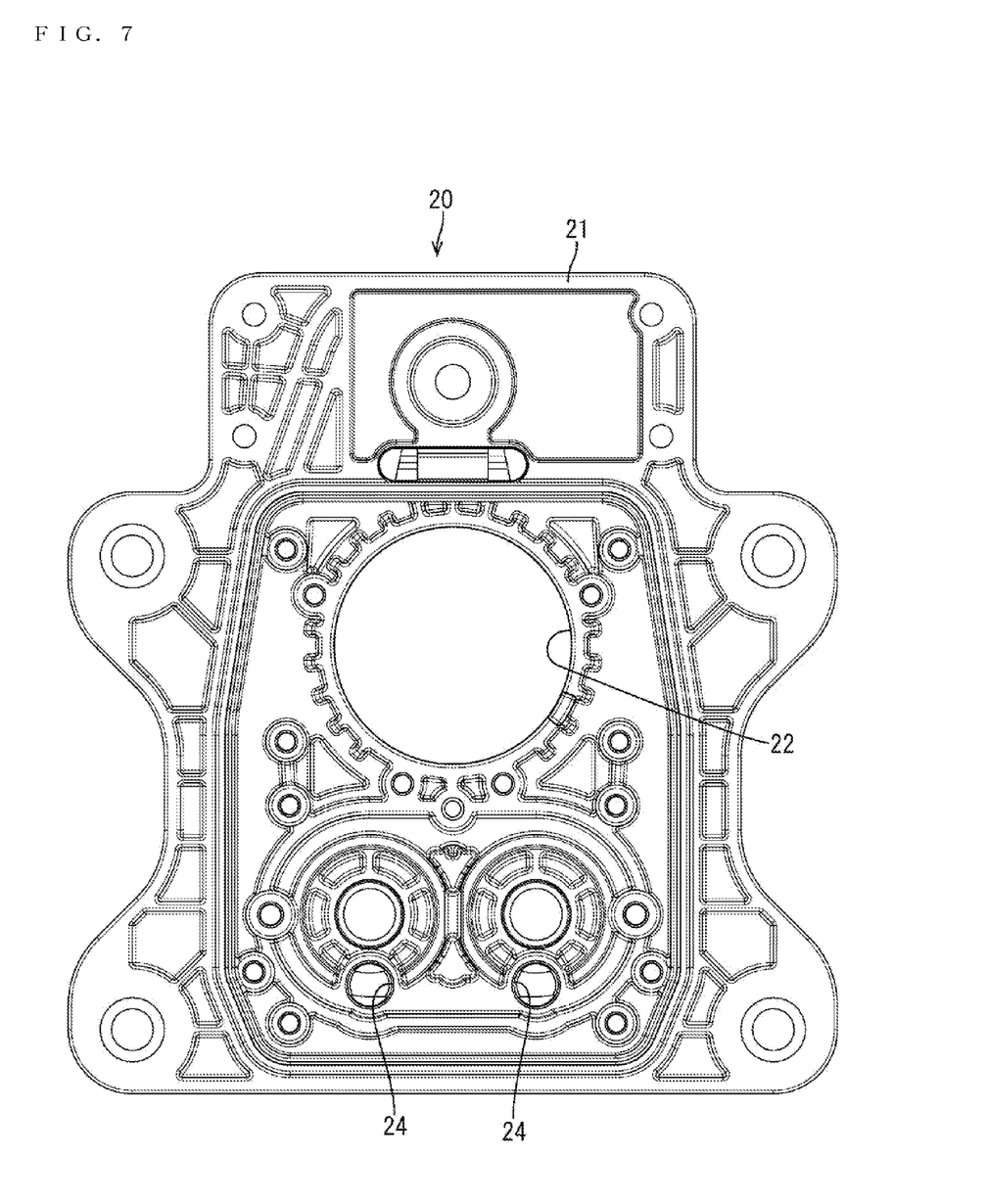
FIG. 7 is a rear view of the inlet housing.

The intermediate wall 53 is provided with a first water guide 51 including a first water guide hole 52. The first water guide hole 52 is located at the lowermost part of the first hood 50, extends through the intermediate wall 53 in the vertical direction, and is open to the front. Further, as shown in FIG. 7, a mounting hole 22 for mounting the first connector fitting 30 is formed through the mounting plate 21 in the front-rear direction.

Figure 4:
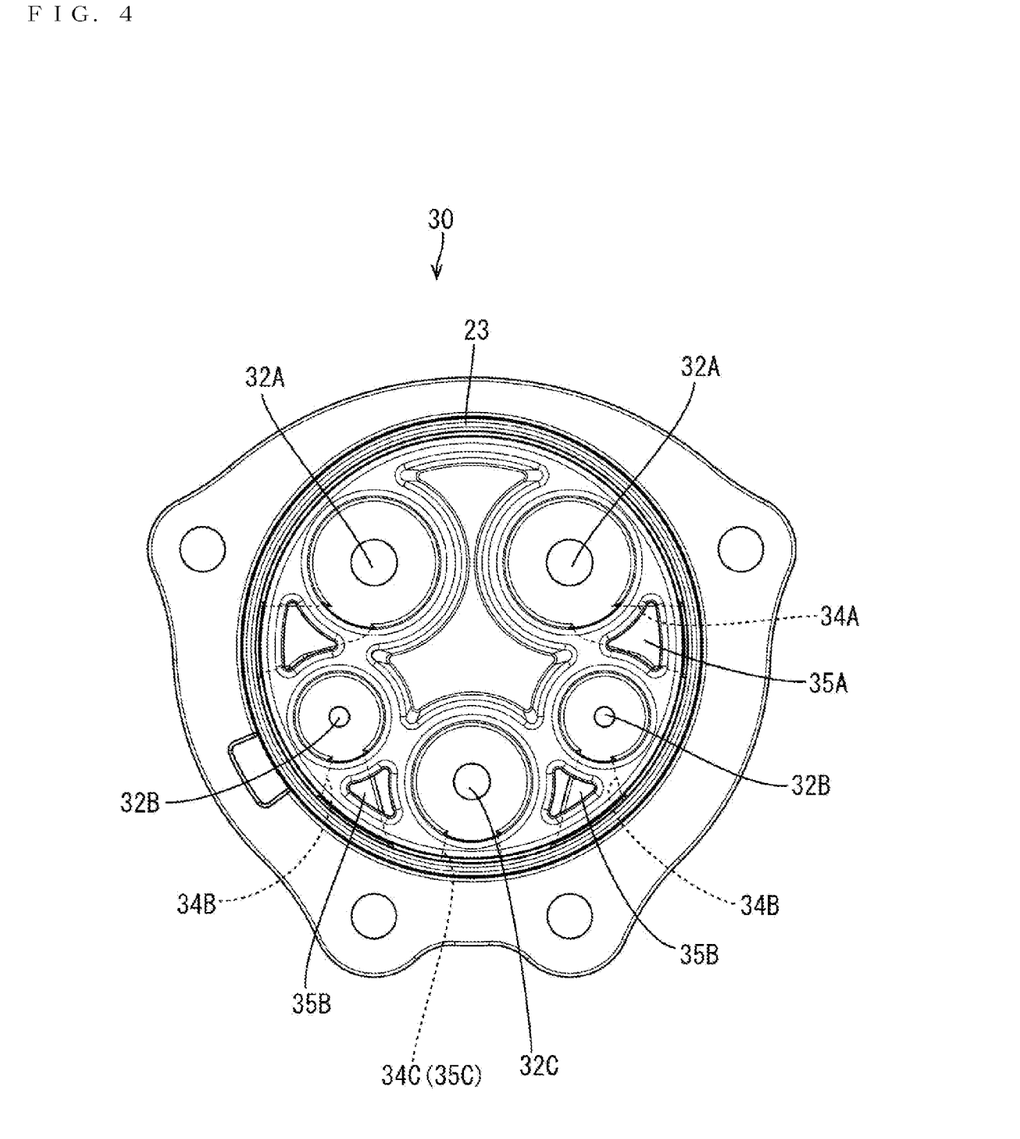
FIG. 4 is a front view of the first connector fitting portion, as viewed from the front in the fitting direction.

The first connector fitting 30 is made of a synthetic resin, and has an outer peripheral surface having a right circular shape as viewed from the front, as shown in FIGS. 1 and 4. A mounting groove 36 is provided around the outer peripheral surface of the first connector fitting 30 and receives an O-ring 23. The first connector fitting 30 is inserted into the mounting hole 22 of the inlet housing 20 from the rear and is mounted fixedly to the mounting plate 21 by being bolted from the rear. Thus, the O-ring 23 is sandwiched between the inner peripheral surface of the mounting hole 22 and the outer peripheral surface of the first connector fitting 30 to seal the inside of the vehicle.

First cavities are formed in the first connector fitting 30 and accommodate first terminals. Specifically, the first terminals comprise two upper first terminals 31A disposed at an upper part, two middle first terminals 31B disposed at a middle part, and a lower first terminal 31C disposed at a lower part. Likewise, the first cavities comprise upper first cavities 32A that accommodate the upper first terminals 31A, middle first cavities 32B that accommodate the middle first terminals 31B, and a lower first cavity 32C that accommodates the lower first terminal 31C. After the first terminals 31A to 31C are inserted into the first cavities 32A to 32C, the first retainer 70 is mounted to the inlet housing 20 from the rear to retain the first terminals 31A to 31C.

The second connector fitting 40 has a horizontally elongated oblong shape as viewed from the front. Second cavities are formed in the second connector fitting 40 and accommodate second terminals. Specifically, the second terminals include a left second terminal 41A disposed on the left as viewed from the front, and a right second terminal 41B disposed on the right as viewed from the front. Likewise, the second cavities are include a left second cavity 42A that accommodates the left second terminal 41A and a right second cavity 42B that accommodates the right second terminal 41B. After the second terminals 41A and 41B are inserted into the second cavities 42A and 42B, the second retainer 80 is fixedly mounted to the inlet housing 20 from the rear, thereby retaining the second terminals 41A and 41B together.

Figure 5:
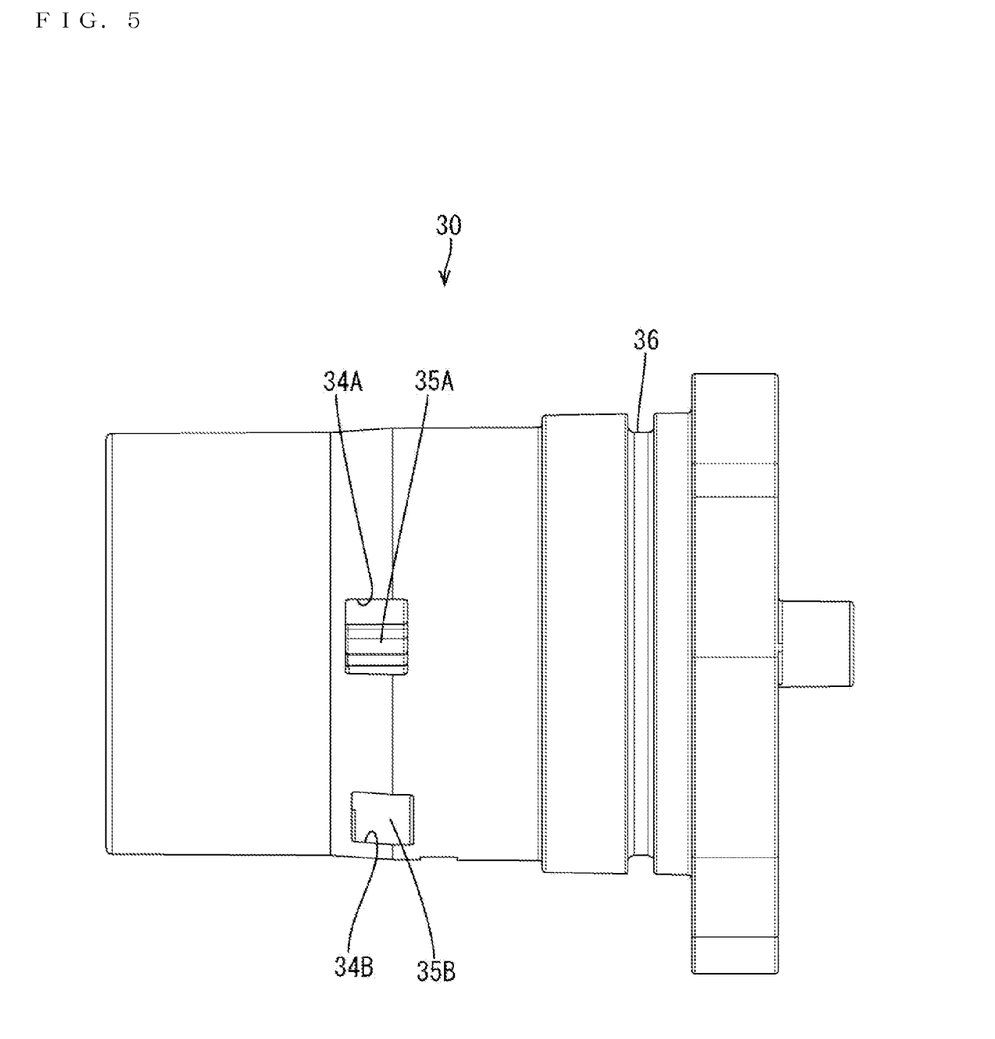
FIG. 5 is a front view of the first connector fitting, as viewed from the side.

The combined charging inlet 10 has a drain route that prevents the entry of water into the vehicle. As shown in FIGS. 2 and 5, a forwardly open annular first drain space 33 is formed between the outer peripheral surface of the first connector fitting 30 and the inner peripheral surface of the first hood 50. Upper first drains 34A are provided between the inner peripheral surface of the upper first cavities 32A and the outer peripheral surface of the first connector fitting 30. The upper first drains 34A include an upper first drain hole 35A that establishes communication between the upper first cavity 32A and the first drain space 33.

Figure 6:
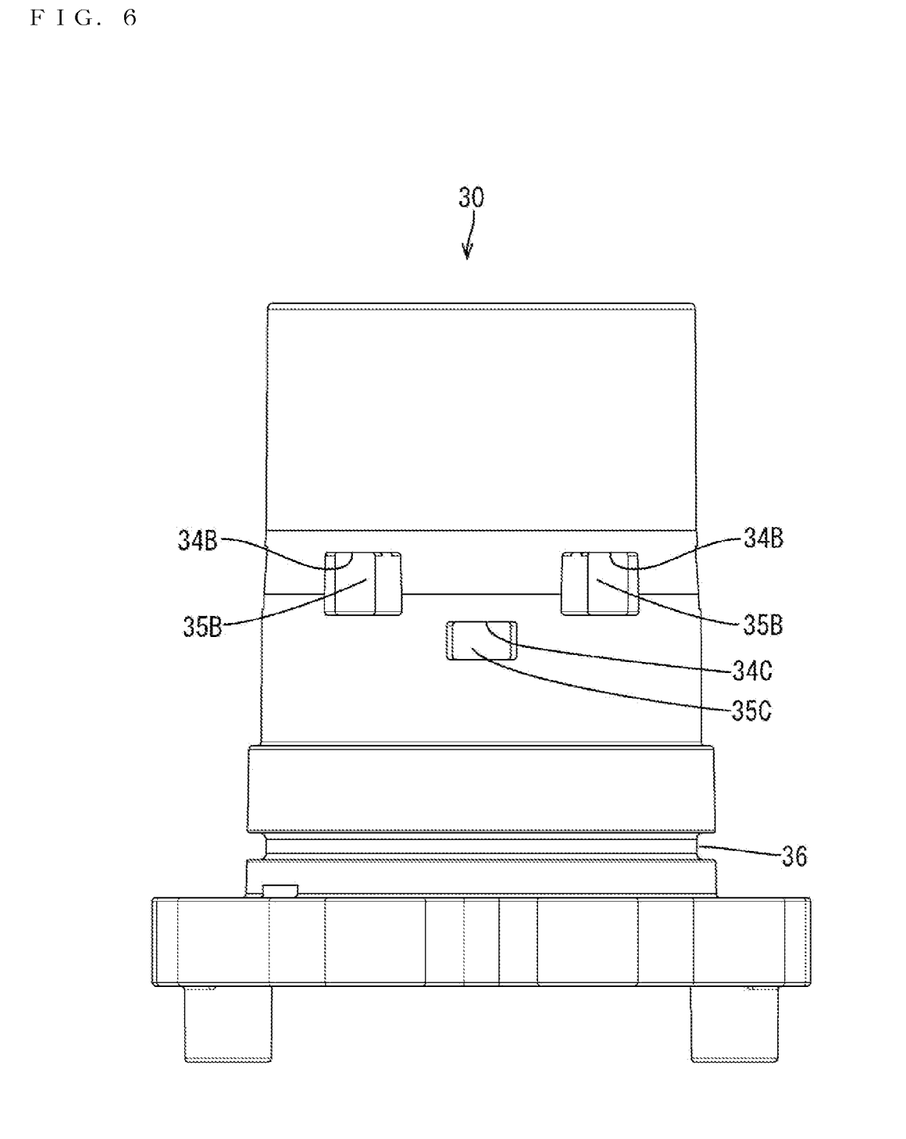
FIG. 6 is a bottom view of the first connector fitting.

Likewise, as shown in FIGS. 2 and 5, middle first drains 34B are provided between the inner peripheral surfaces of the middle first cavities 32B and the outer peripheral surface of the first connector fitting 30. The middle first drain 34B includes a middle first drain hole 35B that establishes communication between the middle first cavity 32B and the first drain space 33. Further, as shown in FIGS. 2 and 6, a lower first drain 34C is provided between the inner peripheral surface of the lower first cavity 32C and the outer peripheral surface of the first connector fitting 30. The lower first drain 34C includes a lower first drain hole 35C that establishes communication between the lower first cavity 32C and the first drain space 33.

A forwardly open second drain space 43 is provided between the outer peripheral surface of the second connector fitting 40 and the inner peripheral surface of the second hood 60 and has a horizontally elongated annular shape as viewed from the front and. A left second drain 44A is provided between the inner peripheral surface of the left second cavity 42A and the outer peripheral surface of the second connector fitting 40. The left second drain 44A includes a left second drain hole 45A that establishes communication between the left second cavity 42A and the second drain space 43. Further, a right second drain 44B is provided between the inner peripheral surface of the right second cavity 42B and the outer peripheral surface of the second connector fitting 40. The right second drain portion 44B includes a right second drain hole 45B that establishes communication between the right second cavity 42B and the second drain space 43.

As shown in FIG. 7, the left second drain 44A faces rearward through a mold removal hole 24 provided on the back side of the inlet housing 20. The mold removal hole 24 enables removal of a sliding pin for molding the left second drain 44A after the molding. Accordingly, after the left second drain 44A has been molded by using the sliding pin, a rubber stopper 25, shown in FIG. 1, is inserted into the mold removal hole 24, thereby closing the route for the water entering into the vehicle from the left second drain hole 45A through the mold removal hole 24. As a result, the left second cavity 42A and the second drain space 43 are in communication via the left second drain hole 45A.

The right second drain 44B has the same configuration as the left second drain portion 44A, and therefore, the description thereof has been omitted. Note, however, that the right second cavity 42B and the second drain space 43 are in communication via the right second drain hole 45B. Additionally, the rubber stoppers 25 mounted to the mold removal holes 24 are fixed to the mold removal holes 24 by being locked simultaneously by the second retainer 80 from the rear, and constitute the back portions of the second drain holes 45A and 45B.

Figure 3:
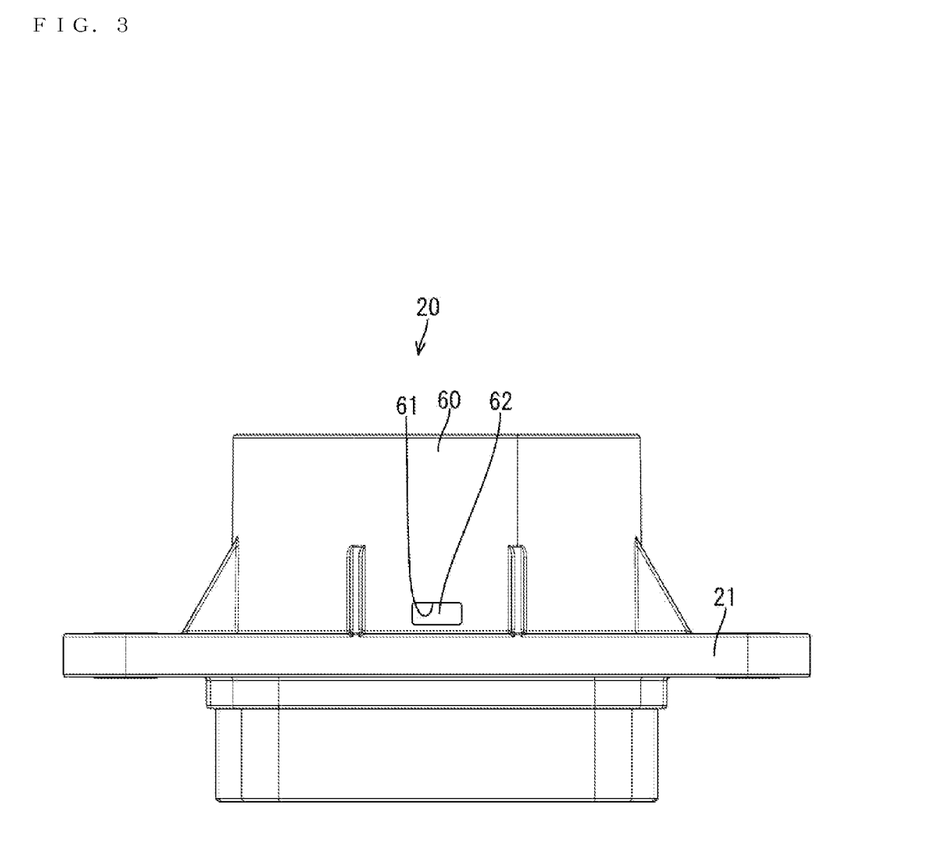
FIG. 3 is a bottom view of the inlet housing.

As shown in FIG. 2, a second water guide 61 is provided between the lower surface of the inner periphery and the lower surface of the outer periphery of the second connector fitting 40 and includes a second water guide hole 62. As shown in FIG. 3, the second water guide hole 62 is located at the center of the lowermost part of the second hood 60, and extends through the peripheral wall of the second hood 60 in the vertical direction.

With reference to FIG. 2, water that directly hits the first connector fitting 30 and has entered the upper first cavity 32A is drained through the upper first drain hole 35A to the first drain space 33. Water that has entered the middle first cavity 32B is drained through the middle first drain hole 35B to the first drain space 33, and water that has entered the lower first cavity 32C is drained through the lower first drain hole 35C to the first drain space 33.

The water that has been drained to the first drain space 33 is guided through the first water guide hole 52 to the second drain space 43, then reaches the lower surface of the inner periphery of the second hood 60 along the outer peripheral surface of the second connector fitting 40, and is guided through the second water guide hole 62 to the outside of the vehicle. Water that has entered the left second cavity 42A is drained through the left second drain hole 45A to the second drain space 43, and is guided to the outside of the vehicle from the lower surface of the inner periphery of the second hood 60 through the second water guide hole 62. Water that has entered the right second cavity 42B is drained through the right second drain hole 45B to the second drain space 43, and is guided to the outside of the vehicle from the lower surface of the inner periphery of the second hood 60 through the second water guide hole 62.

As described above, the first drains (the upper first drains 34A, the middle first drains 34B, the lower first drain 34C) are provided for the first connector fitting 30, the first water guide 51 is provided for the first and second hoods 50 and 60, the second drains (the left second drain 44A, the right second drain 44B) are provided for the second connector fitting 40, the second water guide 61 is provided for the second hood 60, and all of the first and second connector fittings 30 and 40 and the first and second hoods 50 and 60 are disposed outside of the vehicle. Accordingly, the drain routes prevent entry of water into the vehicle.

The first connector fitting 30 may be formed separately from the inlet housing 20, and may be configured to be mounted fixedly to the mounting hole 22 formed in the inlet housing 20 from the rear in the fitting direction, and the O-ring 23 may be sandwiched between the outer peripheral surface of the first connector fitting 30 and the inner peripheral surface of the mounting hole 22.

With this configuration, the first connector fitting 30 is formed separately from the inlet housing 20, and therefore, the first hood 50 will not obstruct the mold removal at the time of molding the first drain of the first connector fitting 30. Further, the O-ring 23 prevents entry of water into the vehicle from the mounting hole 22.

The second drain may include the second drain hole (the left second drain hole 45A, the right second drain hole 45B) formed between the inner peripheral surface of the second cavity (the left second cavity 42A, the right second cavity 42B) and the outer peripheral surface of the second connector fitting 40, the mold removal hole 24 that causes the second drain hole to face rearward in the fitting direction, and the rubber stopper 25 that is mounted to the mold removal hole 24 from the rear in the fitting direction so as to seal the inside of the vehicle and define the second drain hole.

With this configuration, water that has entered the second cavity can be caused to enter the second drain hole and be drained through the second drain hole to the second drain space 43. Further, since the mold removal hole 24 is open rearward in the fitting direction, the second hood 60 will not obstruct the mold removal at the time of molding the second drain of the second connector fitting 40.

The first drain may have the first drain hole (upper first drain holes 35A, middle first drain holes 35B, lower first drain hole 35C) between the inner peripheral surface of the first cavity (upper first cavities 32A, middle first cavities 32B, lower first cavity 32C) and the outer peripheral surface of the first connector fitting 30.

With this configuration, water that enters the first cavity can be caused to enter the first drain hole, and be drained from the first drain hole to the first drain space 33.

The first water guide 51 may include the first water guide hole 52 between the inner peripheral surface of the first hood 50 and the inner peripheral surface of the second hood 60, and the first water guide hole 52 may be open forward in the fitting direction. With this configuration, water that has entered the first drain space 33 will enter the first water guide hole 52, and be guided from the first water guide hole 52 to the second drain space 43.

The technology disclosed herein is not limited to the embodiment described above by way of the description and the drawings, and includes, for example, various embodiments as follows.

Although the above-described embodiment illustrates the combined charging inlet 10 including the first connector fitting 30 and the second connector fitting 40 that are integrated, it is possible to adopt a combined charging inlet including three or more connector fittings that are integrated.

Although the first connector fitting 30 is formed separately from the inlet housing 20 in the above-described embodiment, the first connector fitting may be formed integrally with the inlet housing.

Although the second drain holes 45A and 45B are sealed by using the rubber stoppers 25 in the above-described embodiment, they may be sealed by mounting, to the mold removal holes 24, lids having an O-ring fit to the outer peripheral surface thereof.

Although water that has entered the first cavities 32A to 32C is drained through the first drain holes 35A to 35C to the first drain space 33 in the above-described embodiment, the water may be drained to the first drain space from the front end side of the first connector fitting by using thinned portions disposed around the first cavities.

Although the first water guide hole 52 is provided so as to be open forward in the above-described embodiment, a first water guide having the shape of a groove that is inclined obliquely forward may be provided, and water may be drained to the second drain space from the front end side of the first connector fitting.

LIST OF REFERENCE NUMERALS 10 combined charging inlet
20 inlet housing
22 mounting hole
23 O-ring
24 mold removal hole
25 rubber stopper
30 first connector fitting
31A upper first terminals
31B middle first terminals
31C lower first terminal
32A upper first cavities
32B middle first cavities
32C lower first cavity
33 first drain space
34A upper first drains
34B middle first drains
34C lower first drain
35A upper first drain hole
35B upper first drain hole
35C lower first drain hole
40 second connector fitting
41A left second terminal
41B right second terminal
42A left second cavity
42B right second cavity
43 second drain space
44A left second drain
44B right second drain
45A left second drain hole
45B right second drain hole
50 first hood
51 first water guide
52 first water guide hole
60 second hood
61 second water guide
62 second water guide hole

What is claimed is:

1. A combined charging inlet including a plurality of integrated connector fittings, comprising:
   an inlet housing including a first hood disposed around a first connector fitting and outside of a vehicle, and a second hood disposed around a second connector fitting located below the first connector fitting and outside of the vehicle, the first connector fitting and the second hood being provided integrally and continuously with each other;
   a first drain configured to drain water from a first cavity that accommodates a first terminal in the first connector fitting to a first drain space formed between an outer peripheral surface of the first connector fitting and an inner peripheral surface of the first hood;
   a first water guide configured to guide water from the first drain space to a second drain space formed between an outer peripheral surface of the second connector fitting and an inner peripheral surface of the second hood;
   a second drain configured to drain water from a second cavity that accommodates a second terminal in the second connector fitting to the second drain space; and
   a second water guide configured to guide water from the second drain space to outside of the vehicle.

2. The combined charging inlet of claim 1,
   wherein the first connector fitting is formed separately from the inlet housing and is configured to be mounted fixedly to a mounting hole formed in the inlet housing from a rear in a fitting direction, and an O-ring is sandwiched between the outer peripheral surface of the first connector fitting and an inner peripheral surface of the mounting hole.

3. The combined charging inlet of claim 1,
   wherein the second drain includes a second drain hole formed between an inner peripheral surface of the second cavity and the outer peripheral surface of the second connector fitting, a mold removal hole that causes the second drain hole to face rearward in the fitting direction, and a rubber stopper that is mounted to the mold removal hole from the rear in the fitting direction so as to seal an inside of the vehicle and define the second drain hole.

4. The combined charging inlet of claim 1,
   wherein the first drain includes a first drain hole formed between an inner peripheral surface of the first cavity and the outer peripheral surface of the first connector fitting.

5. The combined charging inlet of claim 1,
   wherein the first water guide includes a first water guide hole formed between the inner peripheral surface of the first hood and the inner peripheral surface of the second hood, and the first water guide hole is open forward in the fitting direction.

* * * * *